United States Patent [19]

Taguchi et al.

[11] 4,440,130

[45] Apr. 3, 1984

[54] IGNITION CONTROL DEVICE

[75] Inventors: Yasuo Taguchi, Yokohama; Satoshi Nakao, Tokyo, both of Japan

[73] Assignee: Tokyo Shibaura Denki Kabushiki Kaisha, Japan

[21] Appl. No.: 283,347

[22] Filed: Jul. 14, 1981

[30] Foreign Application Priority Data

Jul. 15, 1980 [JP] Japan .................................. 55-96750
Jul. 15, 1980 [JP] Japan .................................. 55-96757

[51] Int. Cl.³ ............................................. F02P 5/08
[52] U.S. Cl. ................................. 123/427; 123/406; 123/418; 123/644; 123/415
[58] Field of Search ............... 123/418, 406, 427, 644, 123/415

[56] References Cited

U.S. PATENT DOCUMENTS

| | | | |
|---|---|---|---|
| 3,937,193 | 2/1976 | Kim ..................... | 123/427 |
| 4,131,097 | 12/1978 | Sawada et al. ......... | 123/427 |
| 4,237,835 | 12/1980 | Rabus et al. ........... | 123/418 |
| 4,276,860 | 7/1981 | Caparka ................ | 123/418 |
| 4,292,942 | 10/1981 | Katada et al. .......... | 123/427 |
| 4,347,819 | 9/1982 | Roberts ................. | 123/427 |

Primary Examiner—Raymond A. Nelli
Attorney, Agent, or Firm—Finnegan, Henderson, Farabow, Garrett & Dunner

[57] ABSTRACT

An ignition control device includes a signal generating circuit for generating an output signal which has a frequency corresponding to the rotation speed of an engine, a rotation speed indication voltage generating circuit for generating a voltage which has a level corresponding to the rotation speed of engine, a saw-tooth wave generating circuit for generating a saw-tooth wave signal which changes at a frequency corresponding to the output signal from the signal generating circuit and at a rate corresponding to the voltage applied from the rotation speed indication voltage generating circuit, and a control circuit for generating an ignition signal every time when the saw-tooth wave signal has reached a predetermined voltage. The ignition control device further includes a control circuit for comparing a reference voltage with the saw-tooth wave signal in response to an output signal from the signal generating circuit and controlling the voltage stored in the voltage generating circuit according to the difference between both input signals.

22 Claims, 58 Drawing Figures

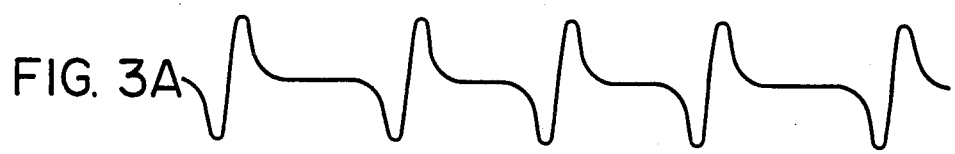
FIG. 3A
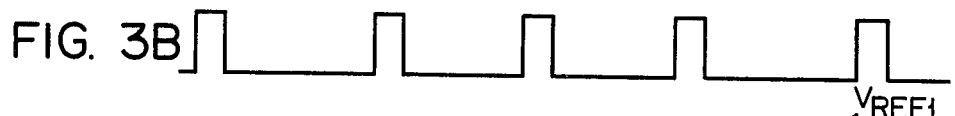
FIG. 3B
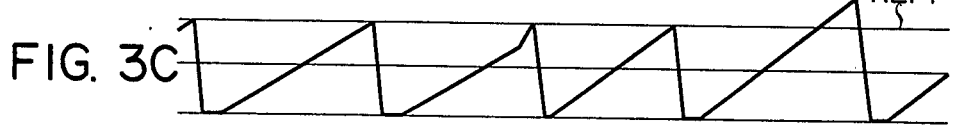
FIG. 3C  V_REF1
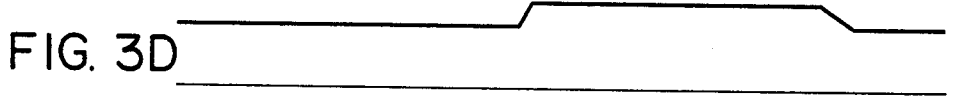
FIG. 3D
FIG. 3E
FIG. 3F
FIG. 3G
FIG. 3H
FIG. 3I

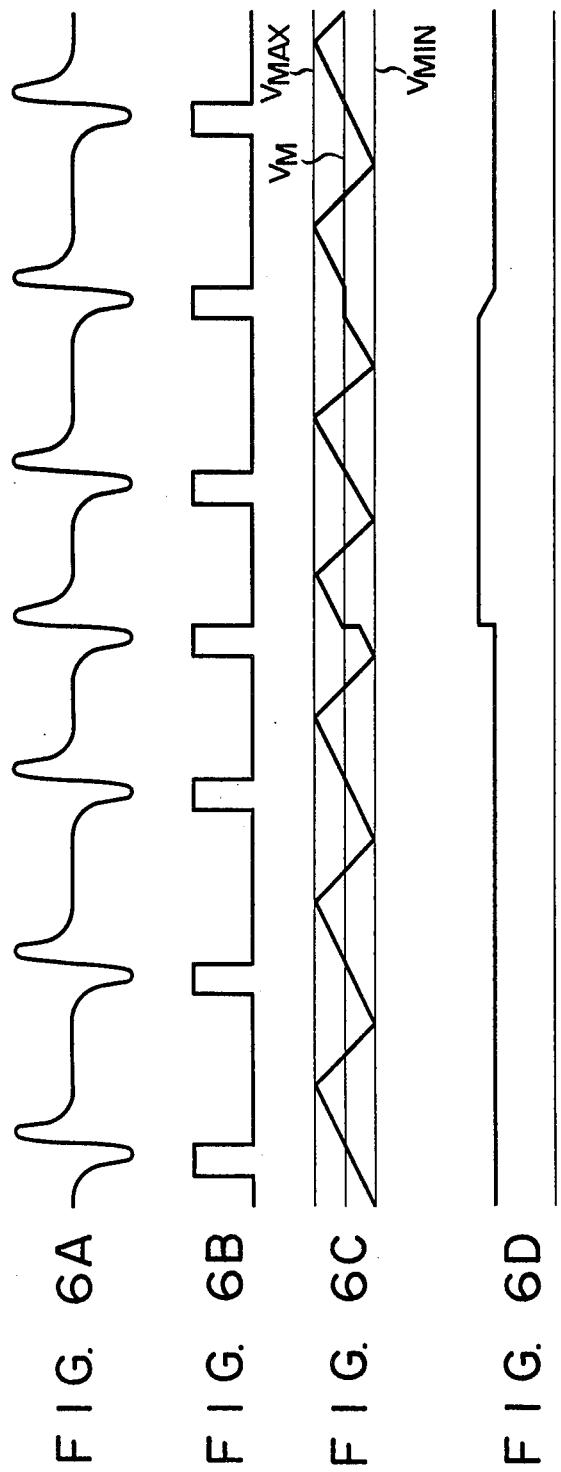

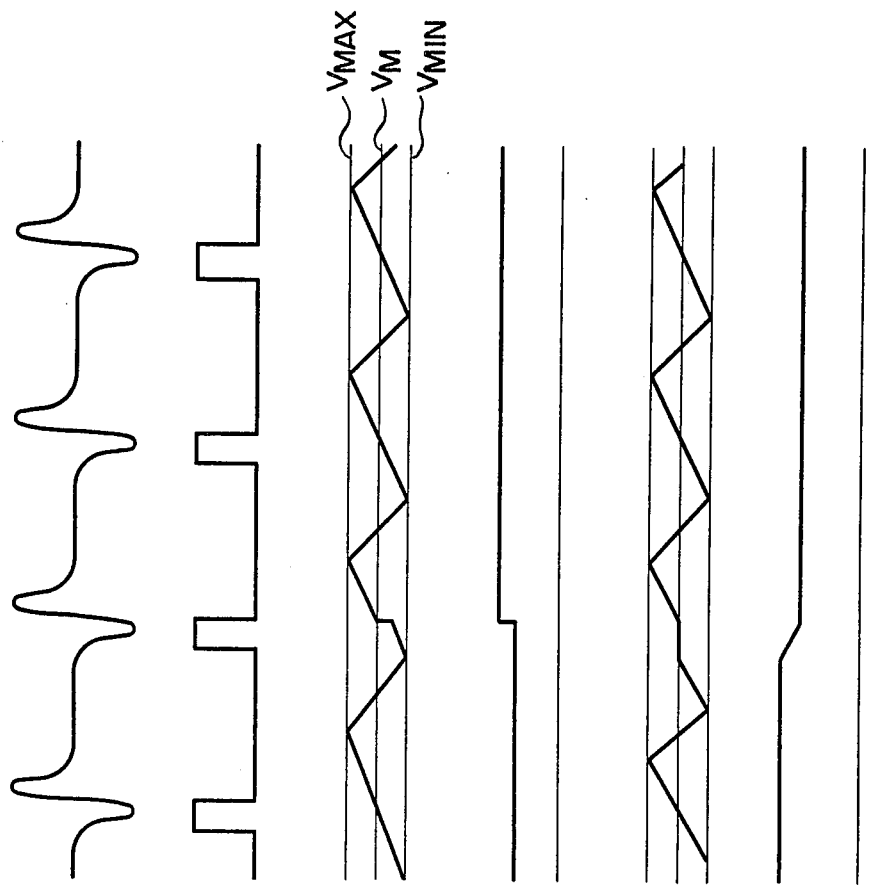

FIG. 9A
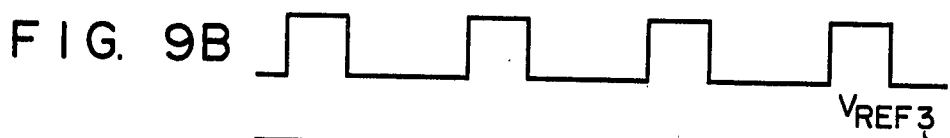
FIG. 9B
FIG. 9C
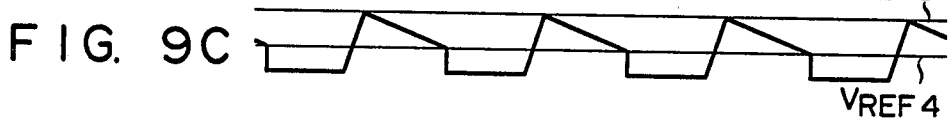
FIG. 9D
FIG. 9E
FIG. 9F
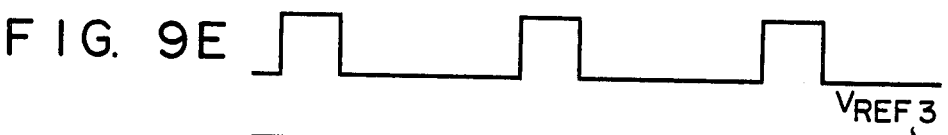
FIG. 9G
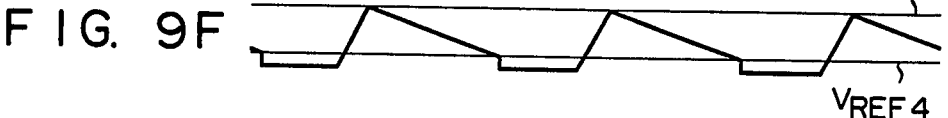
FIG. 9H
FIG. 9I
FIG. 9J
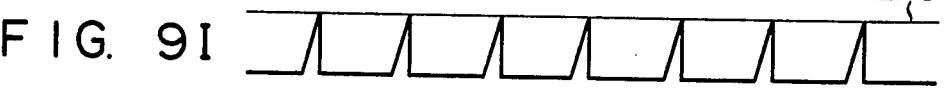

IGNITION CONTROL DEVICE

BACKGROUND OF THE INVENTION

The present invention relates to an ignition control device for use in the internal combustion engine.

FIG. 1 is a circuit diagram showing the conventional ignition device employed in the internal combustion engine. This prior art ignition device includes a signal generator 2 for generating a rotation speed signals. That signal which represents the rotation speed of a shaft, is picked up by a pickup coil of magnet induction type, for example, an ignition timing detector 4 which generates an output pulse representing the ignition timing responsive to an output signal applied from the signal generator 2. The prior art ignition device also includes a series circuit of a primary winding 6-1 of an ignition coil 6 connected between a power source $V_D$ and the ground, a transistor switching circuit 8 and a resistor 10, and a secondary winding 6-2 of ignition coil 6 and an ignition plug 12 connected in series between the power source $V_D$ and ground.

The prior art ignition device further includes a duty cycle control circuit 14 for generating a duty cycle signal responsive to an output signal applied from the ignition timing detector 4 for determining the period for which the switching circuit 8 is kept ON or OFF, and a circuit 16 for driving the switching circuit 8 responsive to an output signal applied from the duty cycle control circuit 14.

A series circuit of resistors 18 and 20 is further connected in parallel with the resistor 10, and an input terminal of a constant current control circuit 22 is connected to the junction between these resistors 18 and 20. This constant current control circuit detects that the current flowing to the primary winding 6-1 of the ignition coil 6 reaches a predetermined value, controls a driver circuit 16 responsive to this current to keep constant the current flowing to the switching circuit 18, and supplies to the duty control circuit 14 an output signal used to achieve duty control in a succeeding cycle.

With ignition devices of this type, it is required to generate a voltage having a level corresponding to the rotation speed of engine in order to cause the duty cycle control circuit 14 to generate a duty cycle signal. This voltage having a level corresponding to the rotation speed of engine is obtained in the prior art by integrating an output signal which is generated from the timing detector 4 synchronizing with the rotation of shaft. Hence, the response speed for a change in the rotation speed is slow. Further, in the case of integrating the output signal applied from the timing detector 4, ripple component is mixed with the integrated voltage, thus making it difficult to obtain a voltage accurately corresponding to the rotation speed of engine. Furthermore, it is necessary that a reference voltage whose level changes according to the rotation speed of engine is compared with a saw-tooth wave signal generated in synchronism with the rotation movement of engine shaft to control the duty cycle, and it therefore becomes necessary to provide a different circuit for generating a saw-tooth wave signal.

SUMMARY OF THE INVENTION

An object of the present invention is to provide an ignition control device simple in construction and capable of quickly and accurately setting the ignition timing according to the rotation speed of engine.

According to the present invention an embodiment of an ignition control device is provided comprising a signal generating means for generating an output signal whose frequency corresponds to rotation speed of internal combustion engine, a voltage storing means for storing a voltage whose level changes according to the rotation speed of engine, a saw-tooth wave generating means for generating a saw-tooth wave signal whose frequency corresponds to an output signal from the signal generating means and whose slope corresponds to an output voltage from the voltage storing means, and a control means for comparing the level of a saw-tooth wave signal from the saw-tooth wave generating means with that of a reference voltage at a timing which is synchronized with an output signal from the signal generating means and controlling the voltage stored in the voltage storing means according to a difference between both levels of input voltages.

According to the present invention a saw-tooth wave signal is generated whose slope and frequency correspond to a rotation speed of the engine and the level of voltage stored in the voltage storing circuit is checked in each cycle of the saw-tooth wave signal to control the voltage storing circuit so as to cause the stored voltage to accurately correspond to the rotation speed of engine, whereby a voltage signal accurately corresponding to the rotation speed of engine can be obtained quickly.

BRIEF DESCRIPTION OF THE DRAWINGS

FIGS. 3A-3I show signal waveforms to explain the operation of ignition device shown in FIG. 2;

FIGS. 6A-6D show signal waveforms to explain control operation effected for a saw-tooth wave signal and rotation speed indicating voltage in accordance with change in the rotation speed of engine;

FIGS. 7A-7F show signal waveforms to explain control operations effected responsive to change in the rotation speed indicating voltage;

FIGS. 9A-9J show signal waveforms to explain the duty cycle control in the ignition control circuit shown in FIG. 4;

DETAILED DESCRIPTION OF THE PREFERRED EMBODIMENTS

Figure 1:
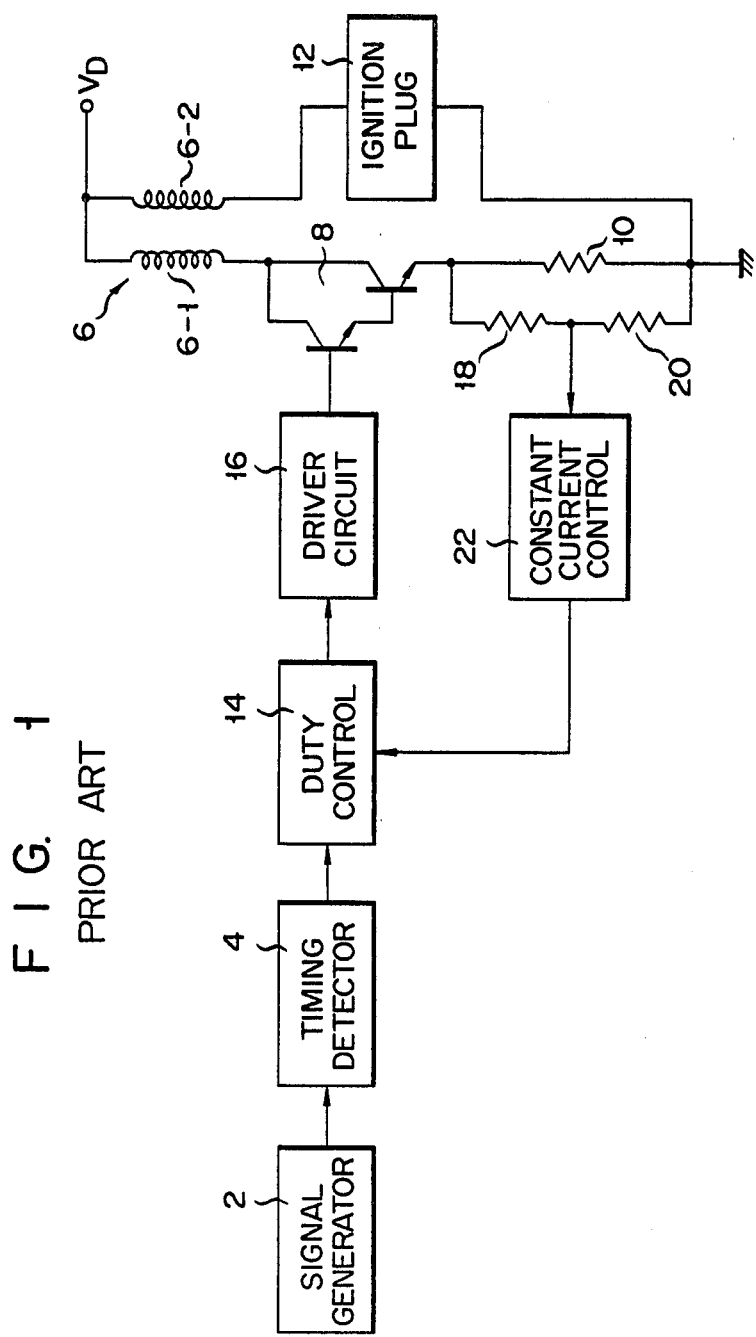
FIG. 1 is a circuit diagram showing the prior art ignition device.
Figure 2:
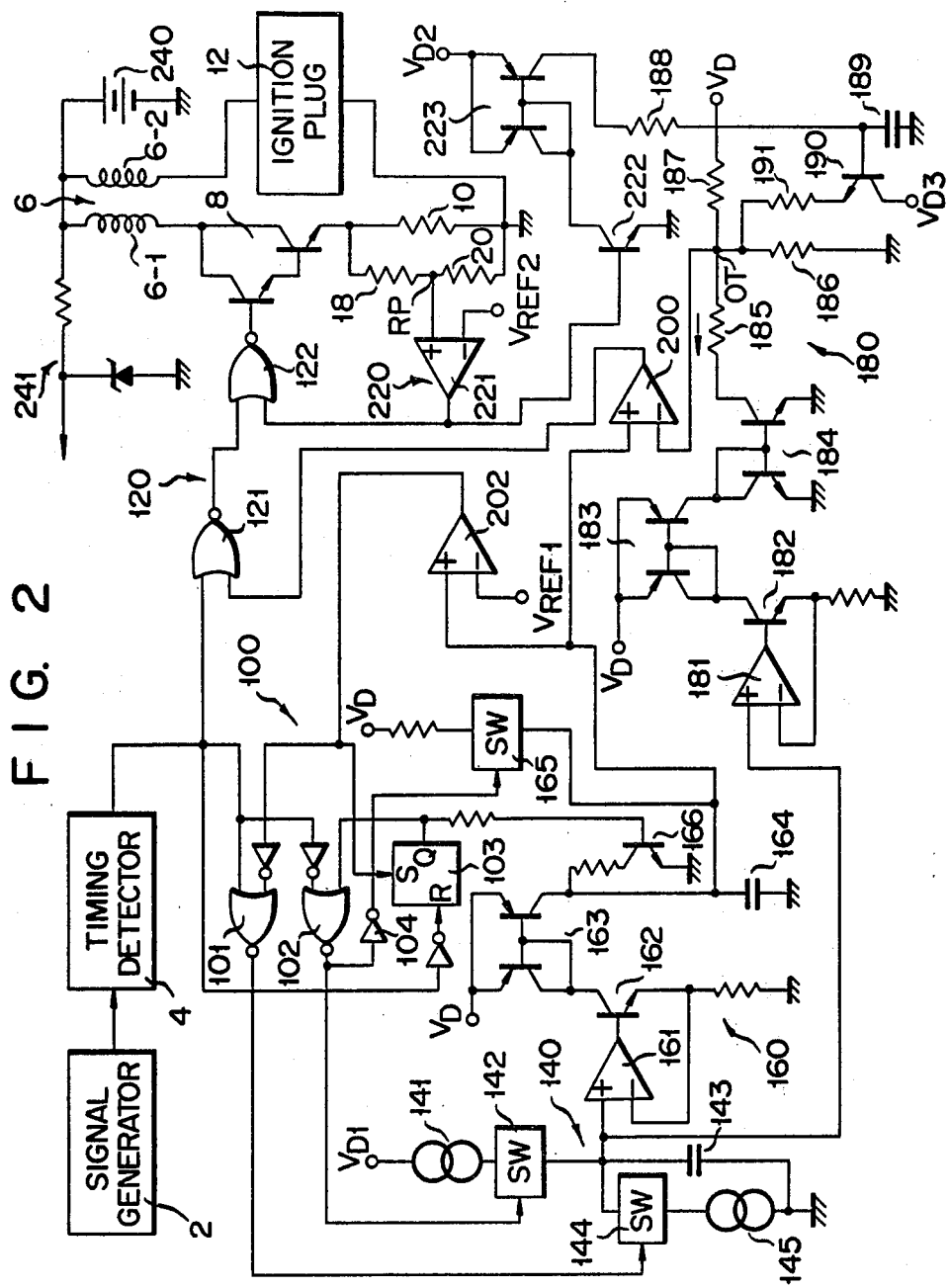
FIG. 2 is a circuit diagram showing an ignition device which employs an example of ignition control device according to the present invention.

FIG. 2 is a circuit diagram showing an ignition device provided with an ignition control device according to one embodiment of the present invention. A signal generator 2, ignition timing detector 4, ignition coil 6, transistor switching circuit 8, resistor 10, ignition plug 12 and resistors 18, 20 shown in FIG. 2 are arranged and connected in the same way as the corresponding parts shown in FIG. 1 are.

An output signal is supplied from the ignition timing detector 4 to a control circuit 100 and a logic circuit 120. First and second control signals from the control circuit 100 are supplied to a voltage storing circuit 140 to control the level of voltage stored in the voltage storing circuit 140. A saw-tooth wave generating circuit 160 generates a saw-tooth wave signal whose slope changes according to a voltage signal from the voltage storing circuit 140. The saw-tooth wave signal has a period determined by third and fourth control signals from the control circuit 100. An output signal from the saw-tooth wave generating circuit 160 is compared by a comparator 200 with a reference voltage signal from a reference voltage generating circuit 180. When it is deleted that the output signal of saw-tooth wave generating circuit 160 is larger than the voltage signal of reference voltage generating circuit 180, the comparator 200 supplies a logic signal "1" to the logic circuit 120. This logic circuit 120 controls the conduction state of transistor switching circuit 8 while being controlled by an output signal from a control circuit 220.

The control circuit 100 includes a NOR gate 101 connected to receive an output signal directly from the timing detector 4, a NOR gate 102 connected to receive an output signal from the timing detector 4 through an inverter, a flip-flop circuit 103 of reset dominant type having a reset input terminal at which an output signal from the timing detector 4 is received via an inverter, and an inverter 104 for inverting the output signal of NOR gate 102. The other input terminal of NOR gate 102 is connected to an output terminal Q of the flip-flop circuit 103. The set input terminal of the flip-flop circuit 103 is connected to an output terminal of a comparator 202 for comparing a reference voltage $V_{REF1}$ with a saw-tooth wave signal applied from the saw-tooth wave generating circuit 160 and generating a high level output signal when it detects that the saw-tooth wave signal is larger than the reference voltage. The other input terminal of the NOR gate 101 is connected to the output terminal of the comparator 202 through an inverter.

The voltage storing circuit 140 includes a current source 141, a switch 142 and a capacitor 143 connected in series between a power source terminal $V_{D1}$ and the ground, and a switch 144 and a current source 145 connected in series between both ends of capacitor 143. Switches 144 and 142 are controlled by first and second control signals applied through the NOR gates 101 and 102 of the control circuit 100. Voltage is charged into the capacitor 143 and this charged voltage is generated as a voltage signal in the voltage storing circuit 140.

The saw-tooth wave generating circuit 160 has an amplifier 161 for receiving a voltage signal from the voltage storing circuit 140, an npn transistor 162 whose base is connected to the output terminal of amplifier 161, and a constant current source 163 whose first current path includes the collector-emitter path of the transistor 162 and whose second current path includes a capacitor 164. One end of the capacitor 164 is grounded while the other end thereof is connected to a switch 165 which is controlled by an output signal from the inverter 104 of the control circuit 100, and to a collector of an npn transistor 166 whose base is connected to an output terminal Q of the flip-flop circuit 103 and whose emitter is grounded.

The reference voltage generating circuit 180 is provided with an amplifier 181 for receiving voltage signal from the voltage storing circuit 140, an npn transistor 182 whose base is connected to the output terminal of amplifier 181, a constant current source 183 whose first current path includes the collector-emitter path of transistor 182, and a constant current source 184 whose first current path is connected in series with a second current path of the constant current source 183 and whose second current path is connected to an output terminal OT via a resistor 185. This output terminal OT is grounded via a resistor 186 and connected to a power source terminal $V_D$ via a resistor 187. The reference voltage generating circuit 180 further includes a resistor 188 and a capacitor 189 connected in series, and an npn transistor 190 whose base is connected to the junction between the resistor 188 and capacitor 189, whose collector to a power source terminal $V_{D3}$, and whose emitter to the output terminal OT via resistor 191.

The control circuit 220 includes a comparator 221 for comparing a reference voltage $V_{REF2}$ with a voltage appearing at a junction RP between the resistors 18 and 20 and generating a high level output signal when the voltage at the junction RP is larger than the reference voltage, an npn transistor 222 whose base is connected to the output terminal of comparator 221, whose collector to the power source terminal $V_{D2}$, and whose emitter is grounded, and a constant current source 223 having a first current path grounded through the collector-emitter path of the transistor 222 and a second current path ground through the resistor 188 and capacitor 189.

The logic circuit 120 includes a NOR gate 121 having input terminals connected to the timing detector 4 and the output terminal of comparator 200, and a NOR gate 122 having input terminals connected to the output terminal of the NOR gate 121 and the output terminal of comparator 221 and having an output terminal connected to the transistor switching circuit 8.

In the case of this ignition device, an output voltage of a battery 240 for supplying current energy to the ignition coil 6 is supplied through a voltage stabilizing circuit 241 as power source voltage necessary for operating the ignition circuit.

The operation of ignition device shown in FIG. 2 will be described with reference to signal waveforms shown in FIGS. 3A to 3I.

Responsive to the rotation movement of engine shaft, an output signal corresponding to the rotation speed or rotation angle of engine shaft is generated from the signal generator 2, as shown in FIG. 3A. Responsive to an output signal of the signal generator 2, the timing detector 4 generates a pulse signal which rises when the output signal reaches a predetermined level and falls when the output signal becomes zero in level, as shown in FIG. 3B.

When the output signal of timing detector 4 becomes low in level, the flip-flop circuit 103 is reset to generate a low level output signal through the output terminal Q thereof. Since a low level output signal is generated from the comparator 202 at this time, both of the NOR gates 101 and 102 generate signals "0" to thereby leave both of switches 142 and 144 open. Therefore, the amplifier 161 biases the transistor 162 with a bias voltage corresponding to the charged voltage of the capacitor 143, whereby current corresponding to this bias voltage flows through the emitter-collector path of transistor 162 causing the charging current to flow into the capacitor 164. Namely, the capacitor 164 is charged at a rate corresponding to the charged voltage of capacitor 143, as shown in FIG. 3C.

When the output signal of the timing detector 4 rises at the same time when the charged voltage of the capacitor 164 reaches the reference voltage $V_{REF1}$, the flip-flop circuit 103 is set to generate a high level output signal from the output terminal Q thereof, whereby the transistor 166 is rendered conductive to discharge the capacitor 164 to zero level.

When the output signal of the timing detector 4 rises before the charged voltage of the capacitor 164 reaches the reference voltage $V_{REF1}$ with the engine being accelerated, a signal "1" is generated from the NOR gate 102 to close switches 142 and 165 for such a period as shown in FIG. 3E and to charge capacitors 143 and 164 as shown in FIGS. 3D and 3C. When the charged voltage of capacitor 164 thus comes to the reference voltage, a high level output signal is generated from the comparator 202 to set the flip-flop circuit 103, whereby a signal "0" is generated from the NOR gate 102 and the transistor 164 is rendered conductive, causing the capacitor 164 to be discharged to zero level.

Since a higher voltage is now charged in the capacitor 143, a saw-tooth wave signal which rises at a sharper slope is generated from the saw-tooth wave generating circuit 160 in a successive cycle and this saw-tooth wave signal is controlled so as to reach the reference voltage $V_{REF1}$ when the output pulse of timing detector 4 rises.

Where the charged voltage of capacitor 164 comes to the reference voltage $V_{REF1}$ before the output signal of timing detector 4 rises when the engine reduced in speed, for example, a high level output signal is generated from the comparator 202 and a signal "1" is generated from the NOR gate 101 to close the switch 144 for a period shown in FIG. 3F, whereby the capacitor 143 is slightly discharged as shown in FIG. 3D to thereby lower the charged voltage thereof slightly. On the other hand, a high level signal is generated from the comparator 202 but a reset signal is supplied to the flip-flop circuit 103 so that the flip-flop circuit 103 is kept reset. When the output signal of the timing detector 4 rises thereafter, the flip-flop circuit 103 is set to render the transistor 166 conductive and to discharge the capacitor 166 to zero level.

When the output signal of the timing detector 4 falls, the capacitor 166 is charged at a rate responsive to the charged voltage of capacitor 143 and a saw-tooth wave signal component is generated from the saw-tooth wave signal generating circuit 160 in the same way as described above. Namely, a saw-tooth wave signal having a slope corresponding to the charged voltage of the capacitor 143 and synchronized with the pulse signal of the timing detector 4 is obtained.

The comparator 200 compares a reference voltage of reference voltage generating circuit 180 with a charged voltage of the capacitor 164 and generates an output signal as shown in FIG. 3G. Therefore, an output signal shown in FIG. 3H is generated from the NOR gate 121. The low level signal of this NOR gate 121 is supplied through the NOR gate 122 to the transistor circuit 8 to render the circuit 8 conductive. Therefore, current shown in FIG. 3I flows through the primary winding 6-1, transistor circuit 8 and resistor 10.

When this current becomes larger than the predetermined value and a voltage appearing at the junction between resistors 18 and 20 becomes larger than the reference voltage $V_{REF2}$, the comparator 221 generates a high level output signal. The high level output circuit from comparator 221 causes a low level signal to be generated from the NOR gate 122 to make the transistor circuit 8 non-conductive, thereby interrupting the current flowing through the primary winding 6-1.

As a result, the comparator 221 produces a low level signal, causing a high level output signal to be produced from the NOR gate 122. Thus, substantially a constant current will flow through the primary winding 6-1. The constant current may continuously flow through the primary winding 6-1 until an output signal from the timing detector 4 changes from the high to low level. The low level output signal from the timing detector 4 causes current flowing to the primary winding 6-1 to be interrupted rapidly, inducing an extremely high voltage in the secondary winding 6-2 to trigger the ignition plug 12.

The reference voltage generating circuit 180 controls the duty cycle of output signal applied from the NOR gate 121 by adjusting the level of reference voltage supplied to the inverted input terminal of comparator 200 according to the charged voltage in the capacitor 143, power source voltage $V_D$ and the time for which the transistor circuit 8 is made conductive. When the power source voltage $V_D$ rises, for example, potential at the output terminal OT also rises causing the reference voltage applied to the comparator 200 to rise. When the charged voltage of the capacitor 143 rises, an increased amount of current flows through the collector-emitter path of the transistor 182 and therefore, an increased amount of current also flows to the constant current circuit 184, whereby current flows through the resistor 185 in the direction shown by an arrow. This causes potential at the output terminal OT to be lowered. Namely, when saw-tooth waves of high frequency are generated, the duty ratio of the output signal of NOR gate 121 is controlled so as to have a larger value.

When the time period during which the transistor circuit 8 is made conductive becomes longer, that is, when the time period during which the high level signal is generated from the comparator 221 becomes longer, the time period during which the transistor 222 is rendered conductive also becomes longer and the capacitor 189 is charged to a higher voltage. Thus, an increased amount of current flows through the collector-emitter path of transistor 190, causing potential at the output terminal OT to rise. Therefore, the reference voltage supplied to the comparator 200 becomes higher and the duty ratio of output signal of NOR gate 121 becomes small.

When the rotation speed of engine changes, saw-tooth wave and charged voltage of capacitor 143 can be corrected in a cycle of rotation speed signal according to the ignition device described above. Therefore, a voltage accurately corresponding to the rotation speed can be obtained between both ends of capacitor 143 and a saw-tooth wave signal synchronized with the output signal of the timing detector 4 can be obtained.

In addition, the saw-tooth wave signal of the saw-tooth wave generating circuit 160 is supplied to the comparator 202 and can be controlled so as to synchronize with the output signal of timing detector 4. Further, the time period during which the transistor circuit 8 is made conductive can be controlled by supplying this saw-tooth wave signal to the comparator 200. Therefore, the circuit arrangement of ignition device can be made simple.

Figure 4:
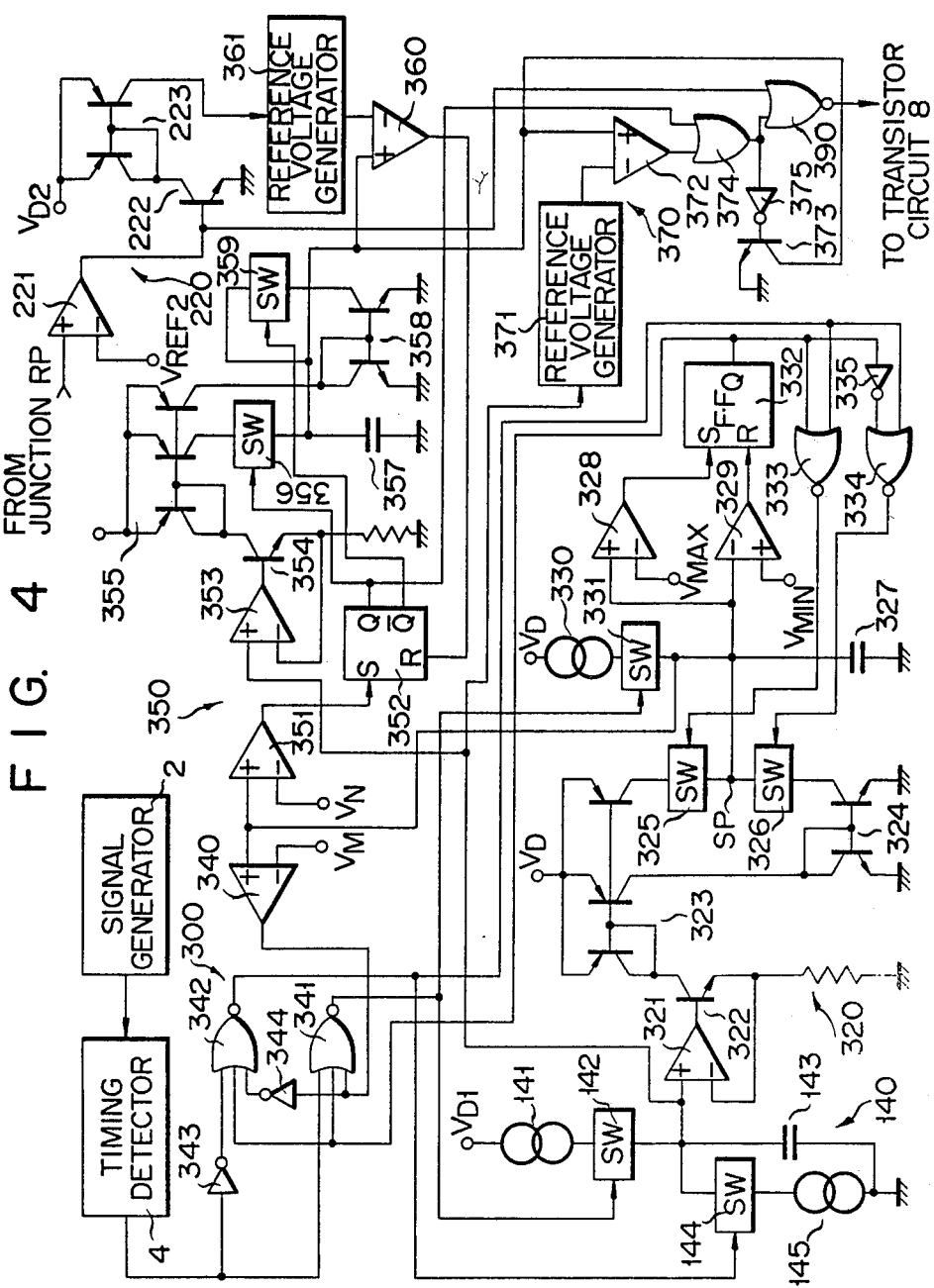
FIG. 4 is a circuit diagram showing another example of ignition control device according to the present invention.

FIG. 4 is a circuit diagram showing another example of ignition control device according to the present invention. Same parts in this ignition control circuit as those employed in the ignition control circuit of FIG. 2 are represented by the same reference numerals and description about these parts is omitted.

According to the ignition control circuit, the output pulse of ignition timing detector 4 is supplied to a control circuit 300. First and second control signals of the control circuit 300 are supplied to switches 144 and 142 of voltage storing circuit 140, respectively, to control the voltage charged in the capacitor 143.

A saw-tooth wave generating circuit 320 generates a saw-tooth wave signal whose slope changes according to a voltage of voltage storing circuit 140 and which has a cycle determined by first and second control signals of the control circuit 300. This saw-tooth wave signal is supplied to a comparator 340 and an ignition timing control circuit 350.

The control signal of the ignition timing control circuit 350 is supplied together with output signals of the voltage storing circuit 140 and control circuit 220 to a duty control circuit 370, which controls the conduction state of the transistor circuit 8 through a NOR gate 390 to thereby control the time period during which current flows to the primary winding 6-1.

The control circuit 300 includes a NOR gate 341 for receiving output signals of the timing detector 4 and comparator 340, and a NOR gate 342 for receiving output signals of the timing detector 4 and comparator 340 through inverters 343 and 344. Output signals of NOR gates 341 and 342 are supplied to switches 142 and 144 of the voltage storing circuit 140, respectively, to thereby control these switches.

The saw-tooth wave generating circuit 320 has an amplifier 321 for receiving the voltage signal of voltage storing circuit 140, an npn transistor 322 whose base is connected to the output terminal of amplifier 321, a constant current source 323 whose first current path includes the collector-emitter path of npn transistor 322, and a constant current source 324 whose first current path is connected to the second current path of the constant current source 323 and whose second current path is connected to the third current path of the constant current source 323 via switches 325 and 326 connected in series therewith.

A junction SP between the switches 325 and 326 is grounded through a capacitor 327 and connected to the non-inverted input terminal of comparators 328 and 329. A current source 330 is connected via a switch 331 to the capacitor 327. The output terminal of the comparators 328 and 329 is connected to set and reset input terminals of a flip-flop circuit 332, respectively. The output terminal Q of the flip-flop circuit 332 is coupled to NOR gates 341 and 342 of the control circuit 300 through an inverter and also connected to the switches 325 and 326 through NOR gates 333 and 334. The output terminal of the NOR gate 342 is connected to the other input terminal of the NOR gate 333 and the output terminal of the NOR gate 342 is connected to the other input terminal of the NOR gate 324.

The ignition timing control circuit 350 includes: a comparator 351 for comparing the charged voltage of the capacitor 327 with an ignition timing control voltage $V_N$ which is generated from the ignition timing control circuit so as to obtain an optimum ignition timing; a flip-flop circuit 352 whose set input terminal is connected to the output terminal of the comparator 351; an amplifier 353 for amplifying the charged voltage of the capacitor 143; an npn transistor 354 whose base is connected to the output terminal of the amplifier 353; a constant current source 355 whose first current path includes the collector-emitter path of the transistor 354 and whose second current path is connected to a switch 356 and a capacitor 357; and a constant current source 358 whose first current path is connected to the third current path of the constant current source 355 and whose second current path is connected to the second current path of the constant current source 355 through switches 359 and 356.

Components 353 to 359 form a saw-tooth wave generating circuit which generates a saw-tooth wave voltage at a terminal of capacitor 357. The charged voltage of the capacitor 357 is supplied to the non-inverted input terminal of a comparator 360. To the inverted input terminal of comparator 360 is connected the output terminal of a reference voltage generator 361 which has the same arrangement as that of circuit shown in FIG. 2 and may include the resistor 188, capacitor 189, transistor 190, and resistors 191, 186, 187. The reference voltage generator 361 functions to generate a reference voltage $V_{REF3}$ which changes according to a change in the power source voltage and the period of the high level output signal of the comparator 221. The output terminal of the comparator 360 is connected to the reset input terminal of the flip-flop circuit 352.

A duty control circuit 370 includes a reference voltage generator 371 which has the same arrangement as that of the circuit shown in FIG. 2 and may include the amplifier 181, transistor 182, constant current sources 183, 184 and resistors 185, 186. The reference voltage generator 371 functions to generate a reference voltage $V_{REF4}$ which changes according to a change in the charged voltage of capacitor 143.

The duty control circuit 370 further includes a comparator 372 whose inverted input terminal is connected to the output terminal of the reference voltage generator 371. The non-inverted input terminal of generator 371 is connected to the charged voltage of the capacitor 357 and an npn transistor 373 whose base is connected to the output terminal of the comparator 372 via an OR gate 374 and an inverter 375, whose emitter is grounded, and whose collector is connected to one end of the capacitor 357. The output signal of the comparator 372 is supplied to the transistor circuit 8 through the OR gate 374 and a NOR gate 390.

The fundamental operation of the ignition control circuit shown in FIG. 4 will be described with reference to FIGS. 5A to 5G.

Figure 5A:
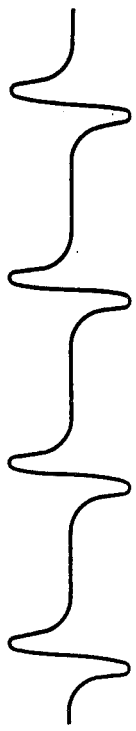
FIGS. 5A-5G show signal waveforms to explain the fundamental operation of ignition control device shown in FIG. 4.
Figure 5B:
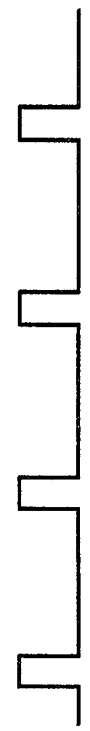

FIGS. 5A and 5B show output signals generated from the signal generator 2 and timing detector 4, respectively.

Figure 5C:
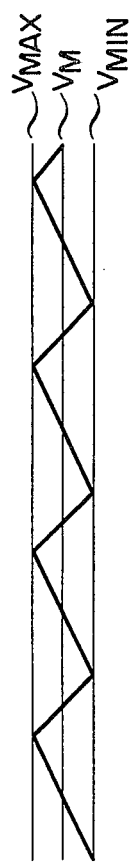

Assume now that a certain voltage is charged in the capacitor 143 and the charged voltage of the capacitor 327 rises gradually from the lowest level thereof. The flip-flop circuit 332 is kept reset and the switch 325 is closed. Providing that the charged voltage of the capacitor 327 increases and has reached an intermediate level $V_M [ = (V_{MIN} + V_{MAX})/2]$ at the time when the output pulse of the timing detector 4 falls, a signal "1" is supplied from the comparator 340 to the NOR gate 341 and a signal "1" from the inverter 343 to the NOR gate 342, so that output signals of NOR gates 341 and 342 are kept "0" in level. Therefore, switches 142 and 144 are kept open and the capacitor 327 is charged at the same rate as before, as shown in FIG. 5C.

When the charged voltage of the capacitor 327 increases to reach the highest level $V_{MAX}$, the flip-flop circuit 332 is set, output signals "0" are generated from NOR gates 333 and 342, and an output signal "1" is generated from the NOR gate 334, causing the switch 326 to be closed. The capacitor 327 is thus dicharged through the switch 326.

Figure 5D:
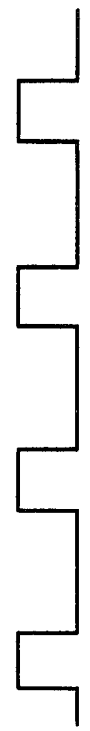

The comparator 351 compares the charged voltage of the capacitor 327 or the output signal of the saw-tooth wave generating circuit 320 with the ignition timing control voltage $V_N$ and generates a high level signal, shown in FIG. 5D, over the time period during which the saw-tooth wave signal rises from the predetermined value to the ignition timing control voltage.

Figure 5E:
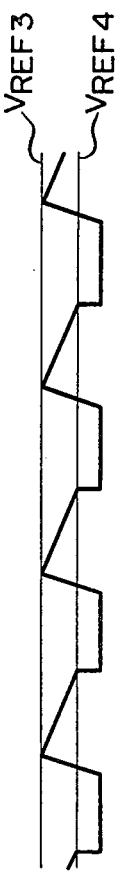

The flip-flop circuit 352 is set by the fall of an output signal of the comparator 351 and the switch 356 is closed to thereby cause the capacitor 357 to be charged as shown in FIG. 5E. When the charged voltage of the capacitor 357 increases like this and reaches the reference voltage $V_{REF3}$ determined by the reference voltage generator 361, the comparator 360 generates a high level output signal to reset the flip-flop circuit 352, whereby the switch 356 is opened with the switch 359 closed and the capacitor 357 is gradually discharged via switch 359.

Figure 5F:
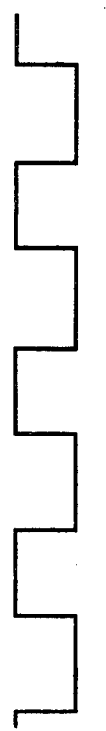

When the charged voltage of the capacitor 357 decreases gradually and becomes smaller than the reference voltage $V_{REF4}$ ($<V_{REF3}$) determined by the reference voltage generator 371, the comparator 372 generates a low level output signal as shown in FIG. 5F to render the transistor 373 conductive. The charged voltage of the capacitor 357 is lowered to 0 V immediately.

Figure 5G:

The low level output signal of the comparator 372 is supplied through the NOR gate 390 to the transistor circuit 8 (FIG. 2) and this transistor circuit 8 is made conductive to thereby cause current to flow through the primary winding 6-1 as shown in FIG. 5G.

When a voltage at the junction RP between resistors 18 and 20 (FIG. 2) becomes larger than the reference voltage $V_{REF2}$ due to current flowing through the primary winding 6-1, the comparator 221 generates a high level output signal to make the output signal of NOR gate 390 low in level. The transistor circuit 8 is thus rendered non-conductive to thereby interrupt current flowing to the primary winding 6-1. As a result, the comparator 221 generates a low level signal and the NOR gate 390 a high level output signal again, thus allowing a predetermined constant current to flow through the primary winding 6-1. This condition is held until the saw-tooth wave signal of the saw-tooth wave generating circuit 320 reaches the ignition timing control voltage $V_N$ to set the flip-flop circuit 352. Namely, when the flip-flop circuit 352 is set, an output signal "0" is generated through the NOR gate 390 to make the transistor circuit 8 non-conductive, so that a large induction voltage is generated in the secondary winding 6-2. Therefore, the ignition timing can be controlled by changing the ignition timing control voltage $V_N$ applied to the comparator 351.

Phase control carried out in the ignition control circuit shown in FIG. 4 and according to the change in the rotation speed of engine will be described with reference to FIGS. 6A to 6D.

When the engine is accelerated from constant speed, the saw-tooth wave signal of the saw-tooth wave generating circuit 320 has a value smaller than a reference voltage $V_M$ at the time when the output pulse of the timing detector 4 falls, as shown in FIGS. 6A and 6B. Therefore, immediately after the output pulse of the timing detector 4 falls, the timing detector 4 and comparator 340 generate signals "0", so that the NOR gate 341 generates a signal "1". The switches 142 and 143 are thus closed and the capacitors 327 and 143 are charged to predetermined voltages, respectively, as shown in FIGS. 6C and 6D.

When the engine is slowed down thereafter as shown in FIGS. 6A and 6B, the saw-tooth wave signal of the saw-tooth wave generating circuit 320 has reached the reference voltage $V_M$ before the output pulse of timing detector 4 falls. High and low level output signals are generated from the timing detector 4 and flip-flop circuit 332, respectively, in this case. Therefore, when a high level signal is generated from the comparator 340, the NOR gate 342 generates a high level signal to close the switch 144, whereby the charged voltage of the capacitor 143 is decreased at a predetermined rate until the timing signal becomes low in level, as shown in FIG. 6D.

Output signals "0" are generated from the NOR gates 333 and 334 in this case with both switches 325 and 326 opened, so that the charged voltage of the capacitor 327 is held to have a value slightly larger than the reference voltage $V_M$. When the timing signal of the timing detector 4 becomes low in level thereafter, the switch 144 is opened, the charged voltage of the capacitor 143 is held constant, and the capacitor 327 is charged at a rate corresponding to the charged voltage of the capacitor 143. Therefore, when the rotation speed of engine changes, the charged voltage of the capacitor 143 is controlled in level and the saw-tooth wave signal of the saw-tooth wave generating circuit 320 is phase-controlled so as to synchronize with the timing signal of the timing detector 4.

There will now be described with reference to FIGS. 7A to 7F how the change in the charged voltage of the capacitor 143 is compensated in the ignition control circuit shown in FIG. 4.

Assume now that when the engine is rotating at a constant speed as shown in FIGS. 7A and 7B, the charged voltage of the capacitor 143 has a value smaller than the optimum one as shown in FIG. 7D. A saw-tooth wave signal which changes to have a slope corresponding to this low charged voltage is generated from the saw-tooth wave generating circuit 320 as shown in FIG. 7C. It is detected by the comparator 340 in this case that the saw-tooth wave signal has a value smaller than the reference voltage $V_M$ at the time when the output pulse of the timing detector 4 falls. Therefore, the switches 142 and 331 are closed and capacitors 143 and 327 are charged as described above. Namely, the capacitor 143 is charged to the optimum value as shown in FIG. 7D.

On the other hand, when the charged voltage of the capacitor 143 has a value larger than the optimum one as shown in FIG. 7F, a saw-tooth wave signal which changes to have a slope corresponding to this high charged voltage is generated. This saw-tooth wave signal has reached the reference voltage $V_M$ in this case before the output pulse of the timing detector 4 falls.

Therefore, the switch 144 is closed causing the capacitor 143 to be discharged as described above. Since the switches 325 and 326 are held open in this case, the saw-tooth wave signal is kept to the same value as the reference voltage $V_M$ as shown in FIG. 7E. Thereafter, the saw-tooth wave signal will change to have a slope corresponding to the corrected charged voltage of the capacitor 143.

FIGS. 8A to 8G are intended to explain the ignition timing control effected in the ignition control circuit of FIG. 4.

Figures 8A, 8B, 8C, 8D, 8E, 8F, 8G:
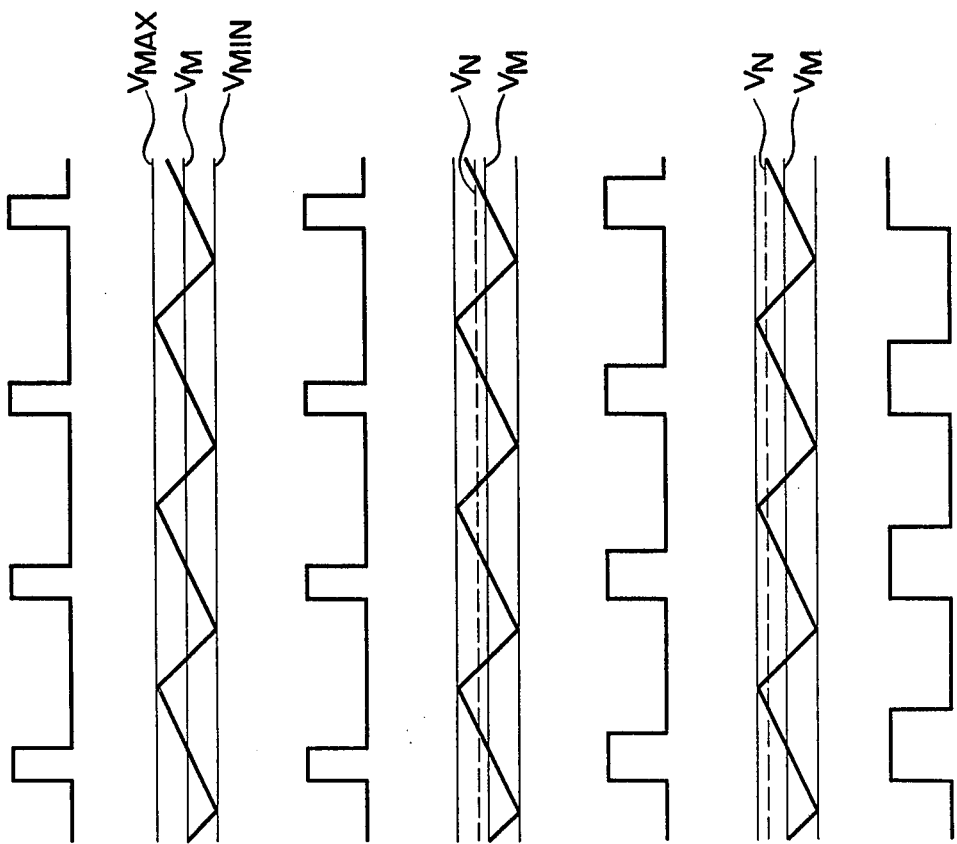
FIGS. 8A-8G show signal waveforms to explain the ignition timing control in the ignition control circuit shown in FIG. 4.

FIG. 8A shows the output pulse signal of the timing detector 4, FIG. 8B the saw-tooth wave signal of the saw-tooth wave generating circuit 320, and FIG. 8C the output signal of the comparator 351 in a case where phase delay is zero. Namely, the ignition timing control voltage $V_N$ is set to be equal to the intermediate voltage $V_M$ in this case.

FIG. 8D shows the saw-tooth wave signal in a case where the ignition timing control voltage $V_N$ is set a little larger than the intermediate voltage $V_M$. The output signal of the comparator 351 falls at a little delayed timing in this case as shown in FIG. 8E. Namely, the ignition timing is delayed a little.

FIG. 8F shows the relation between the saw-tooth wave signal and ignition timing control voltage $V_N$ in a case where the ignition timing is delayed. Namely, the ignition timing control voltage $V_N$ is set by far larger than the intermediate voltage $V_M$ but smaller than the maximum voltage $V_{MAX}$ in this case and the output signal of the comparator 351 falls at a little more delayed timing as shown in FIG. 8G than in the case shown in FIG. 8E. The ignition timing is thus delayed greatly.

This ignition timing control voltage is generated, for example, from a knocking control circuit (not shown) which detects knocking state and optimum ignition timing of engine to control the ignition timing.

FIGS. 9A to 9J are intended to explain the duty control effected in the ignition control circuit shown in FIG. 4.

FIGS. 9A to 9D correspond to FIGS. 5B, 5D, 5E and 5G, respectively, and show the output pulse of the timing detector 4, the output signal of the comparator 351, the charged voltage of the capacitor 357 and current flowing to the primary winding 6-1, respectively.

FIG. 9E shows the output signal generated through the comparator 351 in a case where the engine is rotating at a more delayed speed, FIG. 9F the charged voltage of the capacitor 357, and FIG. 9G current flowing through the primary winding 6-1. The charged voltage of the capacitor 143 is low in this case and charge and discharge in the capacitor 357 are carried out slowly or at a lower rate accordingly. In addition, the output voltage $V_{REF4}$ of the reference voltage generator 371 is set to have a smaller value. Therefore, the duty cycle of a current flowing through the primary winding 6-1 becomes small as shown in FIG. 9G.

FIG. 9H shows the output signal generated through the capacitor 351 in a case where the engine is rotating at a faster speed, and FIGS. 9I and 9J show the charged voltage of the capacitor 357 and current flowing through the primary winding 6-1 in this case, respectively. The charged voltage of the capacitor 143 is high in this case. Therefore, charge and discharge in the capacitor 357 are carried out rapidly or at a higher rate and the output voltage of the reference voltage generator 371 is set to have a value larger than the reference voltage $V_{REF3}$, for example. Accordingly, the duty cycle of a current flowing through the primary winding 6-1 becomes large as shown in FIG. 9J.

An appropriate amount of ignition current can be thus obtained by controlling the duty cycle of current flowing through the primary winding 6-1 according to the change in the rotation speed of engine.

FIGS. 10A to 10E are intended to explain the control of ignition current effected according to the change in the output voltage of power source 240 (FIG. 2).

Figure 10A:
FIGS. 10A-10E show signal waveforms to explain the ignition current control in the ignition control circuit shown in FIG. 4.
Figure 10B:
Figure 10C:
Figure 10D:
Figure 10E:

FIGS. 10A to 10C show the output signal of the comparator 351, the charged voltage of the capacitor 357 and current flowing through the primary winding 6-1, respectively, where the power source voltage is at a normal level. FIG. 10D shows the charged voltage of the capacitor 357 where the power source voltage is reduced a little, that is, the reference voltage $V_{REF3}$ applied from the reference voltage generator 361 is reduced. In this case, charge of the capacitor 357 is finished for a short time due to the reference voltage $V_{REF3}$ being reduced, and a voltage between both terminals of the capacitor 357 reaches the reference voltage $V_{REF4}$ for a shorter time when the capacitor 357 is discharged because the difference between reference voltages $V_{REF3}$ and $V_{REF4}$ becomes small. Therefore, as shown in FIG. 10E, the duty cycle of a current flowing through the primary winding 6-1 is made large to obtain a large amount of ignition current necessary for the ignition operation.

FIGS. 11A to 11G are intended to explain the control of time length during which a current is allowed to flow through the primary winding 6-1.

FIGS. 11A to 11D show the output signal of the comparator 351, the charged voltage of capacitor 357, current flowing through the primary winding 6-1, and the time period during which current flowing through the primary winding 6-1 is held to have a certain value, respectively, in a case where the power source voltage is in normal level.

Figure 11A:
FIGS. 11A-11G show signal waveforms to explain how the current conduction time of ignition coil is controlled in the ignition control circuit shown in FIG. 4.
Figure 11B:
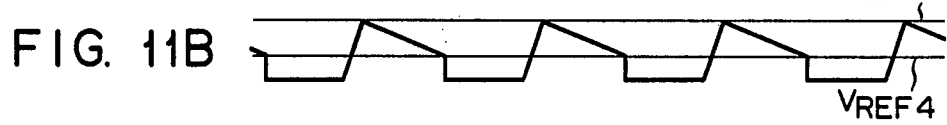
Figure 11C:
Figure 11D:
Figure 11E:
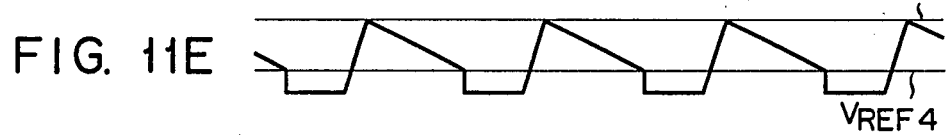
Figure 11F:
Figure 11G:

FIGS. 11E to 11G show the charged voltage of the capacitor 357, current flowing through the primary winding 6-1, and the time period during which current flowing through the primary winding 6-1 is held to have a certain value, respectively, in a case where the time period during which current flowing through the primary winding 6-1 is held to a certain value becomes longer because the property of primary winding 6-1 is changed due to change in temperature, for example.

When the time period during which a current flowing through the primary winding 6-1 is held to a certain value becomes longer, the reference voltage $V_{REF3}$ applied from the reference voltage generator 361 is set to have a larger value in the same way as in FIG. 2, as shown in FIG. 11E. Therefore, the time period during which the capacitor 357 is charged or discharged becomes longer and the time period during which a current is allowed to flow through the primary winding 6-1 is made shorter, as shown in FIG. 11F. When the time period during which a current flowing through the primary winding 6-1 is held to a certain value is made longer due to some cause, the reference voltage $V_{REF3}$ is set to a larger value as described above, thus causing the duty cycle of a current which is allowed to flow through the primary winding 6-1 to be made smaller to obtain an appropriately controlled amount of ignition current.

Although the present invention has been described referring to some embodiments thereof, it should be understood that the present invention is not limited to these embodiments. The ignition timing control voltage $V_N$ which, in this example, becomes large when knocking is likely to occur is applied to the inverted input terminal of the comparator 351 in the ignition control circuit shown in FIG. 4, for example, but this ignition timing control voltage $V_N$ may be replaced by any control voltage which serves to control the ignition timing responsive to change in the operational condition of engine.

What we claim is:

1. An ignition control device for an internal combustion engine comprising:

signal generating means for generating an output signal having a frequency which corresponds to the rotation speed of said internal combustion engine;

voltage storing means for storing a voltage having a level which corresponds to the rotation speed of said engine;

saw-tooth wave generating means for generating, in response to said signal generating means output signal, a saw-tooth wave signal having a frequency which corresponds to that of the output signal generated from said signal generating means and having a slope corresponding to the output voltage applied from said voltage storing means, said saw-tooth wave signal of each engine rotation starting from a predetermined voltage level at a timing signal synchronized with the output signal from said signal generating means;

first and second reference voltage generating circuits for generating first and second reference voltages;

first control means for comparing the first reference voltage with the saw-tooth wave signal generated from the saw-tooth wave generating means at a timing synchronized with the output signal applied from said signal generating means, and for controlling the voltage stored in said voltage storing means according to the difference between the levels of said first reference voltage and said saw-tooth wave signal; and second control means for generating an ignition control signal when the saw-tooth wave signal generated from the saw-tooth wave generating means has reached the second reference voltage level.

2. An ignition control device according to claim 1 wherein said first control means includes a comparator circuit for comparing the first reference voltage with the saw-tooth wave signal generated from said saw-tooth wave generating means, and a first control circuit connected to said signal generating means and comparator circuit and supplying an output signal to said voltage storing means and saw-tooth wave generating circuit when it is detected in response to an output signal generated from said signal generating means that the saw-tooth wave signal does not reach the first reference voltage in level, and controlling the level of the voltage stored in said voltage storing means to make the voltage level of the saw-tooth wave signal equal to the first reference voltage level.

3. An ignition control device according to claim 2 wherein said first control means further includes a second control circuit for supplying an output singal to said voltage storing means when it is detected that the saw-tooth wave signal has reached the first reference voltage in level before said first control circuit is rendered operative in response to an output signal generated from said signal generating means, and controlling the level of the voltage stored in said voltage storing means.

4. An ignition control device according to claim 1 wherein said voltage storing means includes a capacitor, a charging circuit for charging the capacitor, and a discharging circuit for discharging the capacitor.

5. An ignition control device according to claim 4 wherein said first control means includes a comparator circuit for comparing the first reference voltage with the saw-tooth wave signal generated from said saw-tooth wave generating means, and a first control circuit connected to said signal generating means and comparator circuit and supplying an output signal to said charging circuit to charge said capacitor when it is detected in response to an output signal generated from said signal generating means that the saw-tooth wave signal does not reach the first reference voltage in level.

6. An ignition control device according to claim 5 wherein said first control means further includes a second control circuit for supplying an output signal to said discharging circuit to discharge said capacitor when it is detected that the saw-tooth wave signal has reached the first reference voltage in level before said first control circuit is made operative in response to an output singal generated from said signal generating means.

7. An ignition control device according to claim 1 wherein said second reference voltage generating circuit includes a first reference voltage level controlling circuit for changing the level of the second reference voltage according to a change in power source voltage.

8. An ignition control device according to claim 7 wherein said second reference voltage generating circuit further includes a second reference voltage level controlling circuit for changing the level of the second reference voltage according to a change in the voltage stored in said voltage storing means.

9. An ignition control device according to claim 8 wherein said second control means further includes a constant current holding circuit for holding current, which flows through an ignition coil, at a predetermined value.

10. An ignition control device according to claim 9 wherein said second reference voltage generating circuit includes a third reference voltage level controlling circuit for changing the second reference voltage level according to the time period during which said constant current holding circuit holds current flowing through said ignition coil at the predetermined value.

11. An ignition control device according to claim 1 wherein said second reference voltage generating circuit further includes a reference voltage level controlling circuit for changing the level of the second reference voltage according to a change in the voltage stored in said voltage storing means.

12. An ignition control device according to claim 1 wherein said second control means further includes a constant current holding circuit for holding current, which flows through an ignition coil, at a predetermined value.

13. An ignition control device according to claim 12 wherein said second reference voltage generating circuit includes a reference voltage level controlling circuit for changing the second reference voltage level according to the time period during which said constant current holding circuit holds current flowing through said ignition coil at the predetermined value.

14. An ignition control device according to claim 1 wherein said second control means includes a comparator for generating an output signal when the saw-tooth wave signal has reached the second reference voltage in level, and a control circuit for causing a current to flow through a primary winding of said ignition coil in response to an output signal generated from said comparator, and generating a control signal in response to an output signal from said signal generating means, said control signal serving to interrupt the current flow through the primary winding of said ignition coil.

15. An ignition control device according to claim 1 wherein said second control means includes a first comparator for generating an output signal when the saw-tooth wave signal has reached the second reference voltage in level, and a control circuit for generating a control signal in response to an output signal from said first comparator to interrupt the current flow through the primary winding of said ignition coil.

16. An ignition control device according to claim 15 wherein the second reference voltage level is variable.

17. An ignition control device according to claim 15 or 16 wherein said control circuit includes:
- a saw-tooth wave generator for generating a saw-tooth wave signal which has a slope corresponding to the voltage stored in said voltage storing means and which changes in level between third and fourth reference voltages;
- a second comparator for generating an output signal when the output signal from said saw-tooth wave generator has reached the fourth reference voltage in level;
- a first control section for supplying a first control signal to said saw-tooth wave generator in response to an output signal from said first comparator to cause said saw-tooth wave generator to generate a first output signal component which changes in level from the third reference voltage to the fourth reference voltage, and supplying a second control signal to said saw-tooth wave generator in response to an output signal from said second comparator to cause said saw-tooth wave generator to generate a second output signal component which changes in level from the fourth reference voltage to the third reference voltage;
- a second control section for setting the output signal from said saw-tooth wave generator to the third reference voltage level when it is detected that the second output signal component applied from said saw-tooth wave generator has reached a fifth reference voltage in level; and
- a third control section for generating an output signal in response to an output signal of said saw-tooth wave generator which is in the third reference voltage level, said output signal of said third control section being intended to allow current to flow through the primary winding of said ignition coil, and generating an ignition timing signal in response to the first control signal from said first control section, said ignition timing signal being intended to prevent a current from flowing through the primary winding of said ignition coil.

18. An ignition control device according to claim 17 wherein said second control means further includes a constant current holding curcuit for holding a current, which flows through the ignition coil, at a predetermined value.

19. An ignition control device according to claim 18 wherein said fourth reference voltage level is controlled according to the time period during which said constant current holding circuit holds current flowing through the primary winding of said ignition coil at the predetermined value.

20. An ignition control device according to claim 18 wherein said fifth reference voltage level is controlled according to the voltage stored in said voltage storing means.

21. An ignition control device according to claim 1 wherein said signal generating means includes a pulse generator for generating a series of pulses of constant pulse width, and wherein said saw-tooth wave generating means includes a saw-tooth wave generator for generating one cycle of a saw-tooth wave signal in response to the trailing edge of each pulse from said pulse generator.

22. An ignition control device according to claim 21 wherein said first control means includes a comparator for comparing said first reference voltage level and said saw-tooth wave signal in response to the trailing edge of each pulse from said pulse generator and for generating a comparison signal when said saw-tooth wave signal does not reach said first reference voltage level, and a control circuit for setting the voltage level of the saw-tooth wave signal in response to said comparison signal from said comparator.

* * * * *